(12) United States Patent
Nagai et al.

(10) Patent No.: US 6,326,768 B2
(45) Date of Patent: Dec. 4, 2001

(54) METHOD, APPARATUS AND BATTERY PACK FOR CHARGING AND DISCHARGING SECONDARY BATTERIES

(75) Inventors: Tamiji Nagai, Kanagawa; Tamon Ikeda, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/749,490

(22) Filed: Dec. 26, 2000

(30) Foreign Application Priority Data

Dec. 27, 1999 (JP) .................................................. 11-369172

(51) Int. Cl.$^7$ ........................... H01M 10/44; H01M 10/46
(52) U.S. Cl. ............................................. 320/116; 320/117
(58) Field of Search ...................................... 320/116, 117, 320/118, 120, 121

(56) References Cited

U.S. PATENT DOCUMENTS 5,739,669 * 4/1998 Brülhardt ......................... 320/117 X
5,932,932 * 8/1999 Agatsuma et al. ................ 320/116 X
6,078,165 * 6/2000 Ashtiani et al. ...................... 320/116
6,140,799 * 10/2000 Thomasson ........................... 320/117

* cited by examiner

Primary Examiner—Edward H. Tso
(74) Attorney, Agent, or Firm—Frommer Lawrence & Haug LLP; William S. Frommer

(57) ABSTRACT

A rectifying circuit (a) comprising a diode Da and a capacitor Ca is provided for a winding Ta on the secondary side of a transformer T. A rectifying circuit (b) comprising Db and Cb is provided for a winding Tb. A charging device Ra connected to one output of the circuit (a) is connected to the + side of a secondary battery E1. The + side of E1 is connected to an output terminal To1 and the + side of E3 through a switching circuit S1. The − side of E1 is connected to the other output of the circuit (a) and connected to the − side of E3 through S2. Rb connected to one output of the circuit (b) is connected to the + side of E2. The + side of E2 is connected to the + side of E4 through S2. The − side of E2 is connected to the other output of the circuit (b) and connected to the − side of E4 through S3. The − side of E4 is connected to an output terminal To2. S4 is provided between the + side of E1 and the − side of E4.

4 Claims, 13 Drawing Sheets

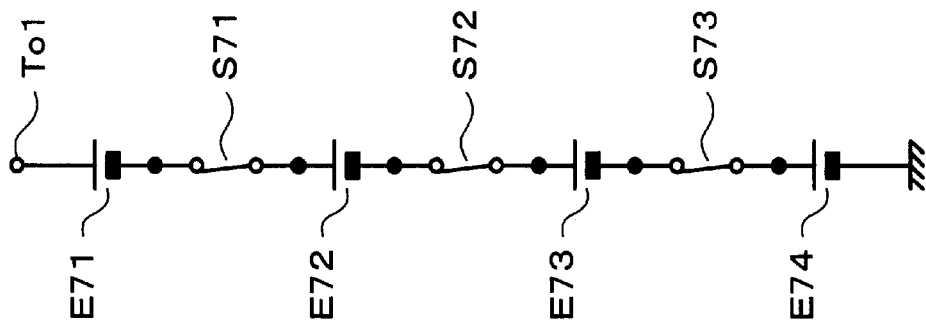
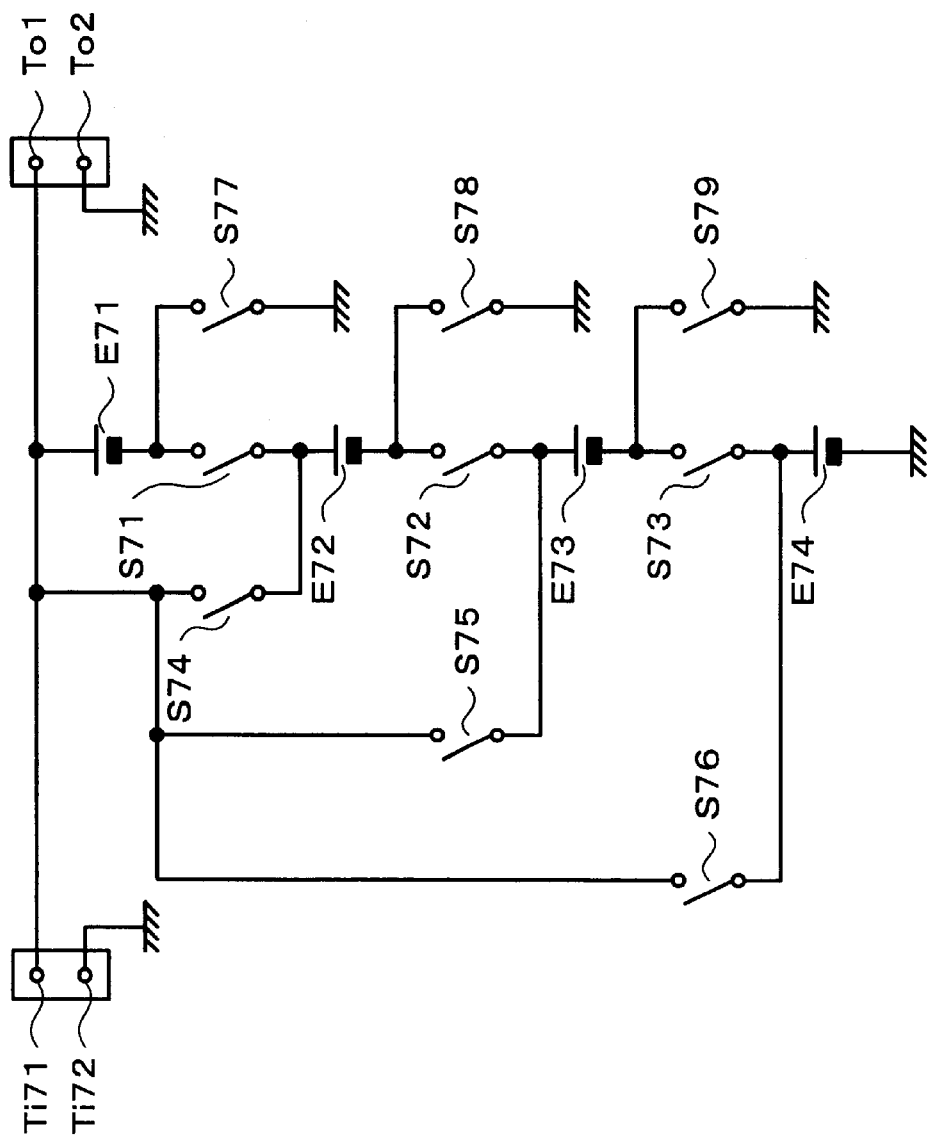

METHOD, APPARATUS AND BATTERY PACK FOR CHARGING AND DISCHARGING SECONDARY BATTERIES

BACKGROUND OF THE INVENTION

1. Field of the Invention

The invention relates to a battery pack, a power source apparatus, and a charging and discharging method, in which a parallel construction and a serial construction of a plurality of secondary batteries can be switched by using switching circuits.

2. Description of the Related Art

A construction such that a plurality of secondary batteries which can be charged and used again are serially arranged and used as a power source of electronic equipment is generally known. In this instance, there is a case where characteristics of a plurality of secondary batteries which are serially arranged, for example, capacities of the secondary batteries are different. If the secondary batteries having different characteristics are charged in a state where they are serially arranged, the secondary battery which is not fully charged or the secondary battery which is overcharged is caused. It is difficult to charge a plurality of secondary batteries arranged serially in this state as mentioned above. A tendency such that the characteristics of the secondary batteries are different becomes more remarkable as the secondary batteries are deteriorated.

Therefore, a method whereby a plurality of secondary batteries which are serially arranged are charged one by one and all of the secondary batteries are fully charged has been proposed as disclosed in JPA-4-248332. For example, as shown in FIG. 1, there is a method of charging two secondary batteries E51 and E52 which are serially arranged one by one. In case of charging the secondary battery E51 by a charging device Rc, switching circuits S51 and S53 are turned on and switching circuits S52 and S54 are turned off. In case of charging the secondary battery E52 by the charging device Rc, the switching circuits S51 and S53 are turned off and switching circuits S52 and S54 are turned on.

Further, a method of charging four secondary batteries E61, E62, E63, and E64 one by one will be described with reference to FIG. 2. To charge the four secondary batteries E61, E62, E63, and E64, respectively, a voltage current is outputted from a charging device Re. For example, when switching circuits S61 and S65 are turned on, the secondary battery E61 is charged and when switching circuits S62 and S66 are turned on, the secondary battery E62 is charged. When switching circuits S63 and S67 are turned on, the secondary battery E63 is charged and when switching circuits S64 and S68 are turned on, the secondary battery E64 is charged.

As shown in FIG. 3A, a voltage current is supplied from an input terminal Ti70. When only a switching circuit S77 is turned on, a secondary battery E71 is charged. When switching circuits S74 and S78 are turned on, a secondary battery E72 is charged. When switching circuits S75 and S79 are turned on, a secondary battery E73 is charged. When only a switching circuit S76 is turned on, a secondary battery E74 is charged. In case of discharging from an output terminal To, switching circuits S71, S72, and S73 are turned on as shown in FIG. 3B.

However, when a plurality of secondary batteries which are serially arranged are charged, since they are charged one by one, there is a problem such that it takes a time until all of the secondary batteries are fully charged.

OBJECTS AND SUMMARY OF THE INVENTION

It is, therefore, an object of the invention to provide a battery pack, a power source apparatus, and a charging and discharging method, in which a plurality of secondary batteries can be switched and used in such a manner that they are serially connected at the time of discharging and are connected in parallel at the time of charging.

According to the invention of claim 1, there is provided a battery pack having a plurality of secondary batteries comprising: N (N≧2) serial circuits for connecting to M (M≧1) secondary batteries in parallel; a charging path for charging the (M×N) secondary batteries in parallel, wherein the charging path are formed by a plurality of switching elements; and a discharging path for discharging the (M×N) secondary batteries by a plurality of switching elements.

According to the invention of claim 3, there is provided a power source apparatus having a plurality of secondary batteries comprising: an input terminal for inputting an AC power source; a battery pack in which N (N≧2) serial circuits for connecting to M (M≧1) secondary batteries in parallel; a charging path for charging the (M×N) secondary batteries in parallel, wherein the charging path are formed by a plurality of switching elements; a discharging path for discharging the (M×N) secondary batteries by a plurality of switching elements; a charging power generating means for charging the battery pack; and a connecting terminal for connecting a load.

According to the invention of claim 4, there is provided a charging and discharging method of charging and discharging a plurality of secondary batteries, comprising the steps of: connecting N (N≧2) serial circuits each comprising M (M≧1) secondary batteries in parallel; and charging the (M×N) secondary batteries in parallel and serially discharging them.

When the (M×N) secondary batteries are charged by M charging devices, (M+1) switching circuits of (N−1) columns to which the (M×N) secondary batteries are connected in parallel are turned on, and (N−1) switching circuits to which the (M×N) secondary batteries are serially connected are turned off.

The above and other objects and features of the present invention will become apparent from the following detailed description and the appended claims with reference to the accompanying drawings.

BRIEF DESCRIPTION OF THE DRAWINGS

FIGS. 3A and 3B are block diagrams for explaining conventional charging and discharging of secondary batteries;

DETAILED DESCRIPTION OF THE PREFERRED EMBODIMENTS

Figure 1:
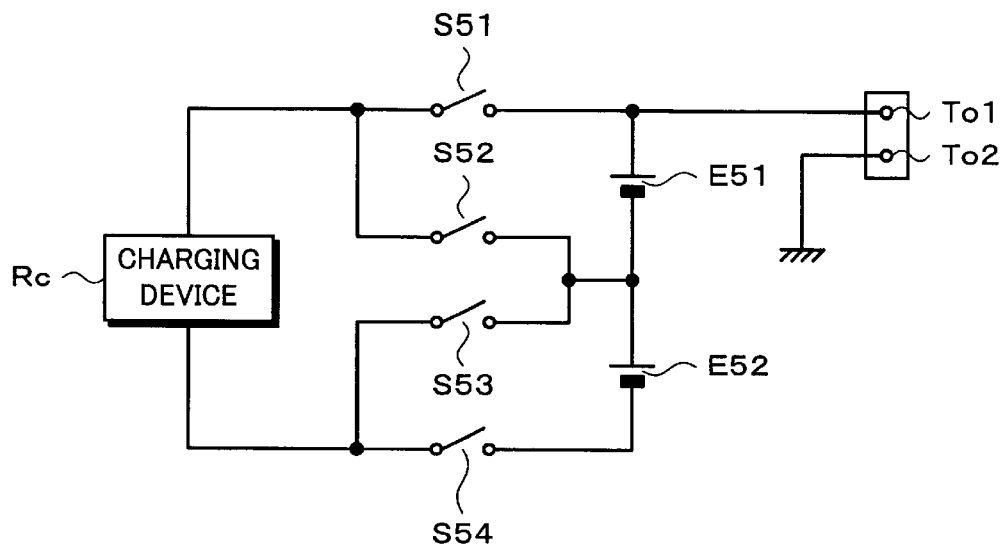
FIG. 1 is a block diagram for explaining a DC/DC switching power source.
Figure 2:
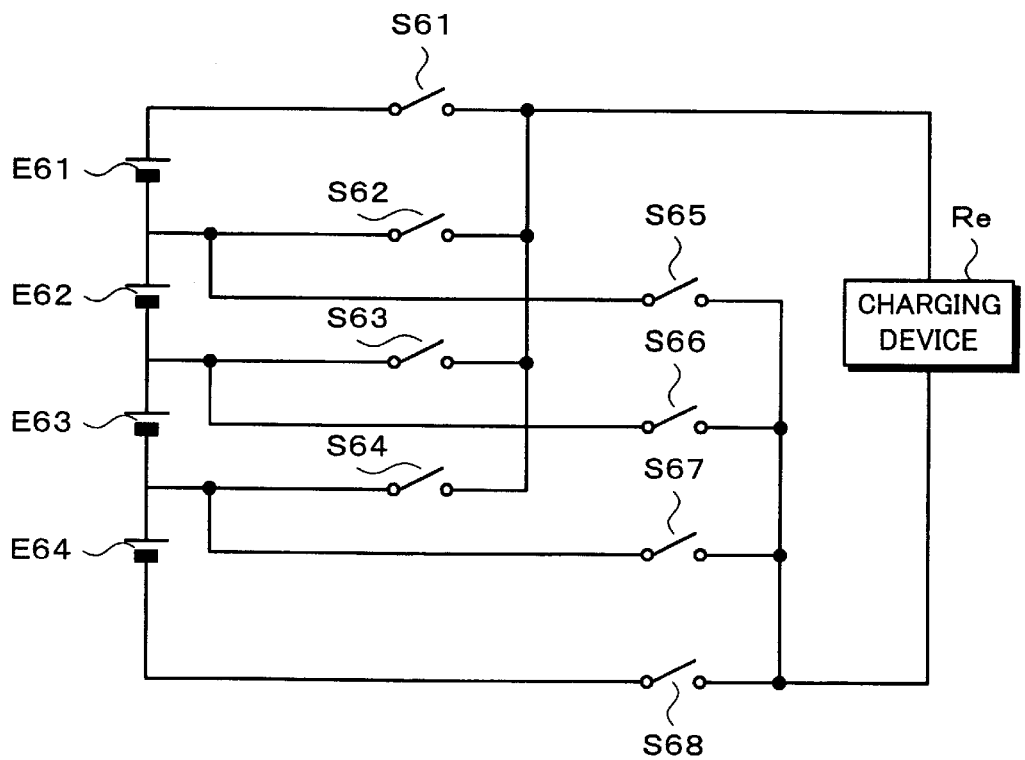
FIG. 2 is a block diagram for explaining a conventional charging of secondary batteries.
Figure 4:
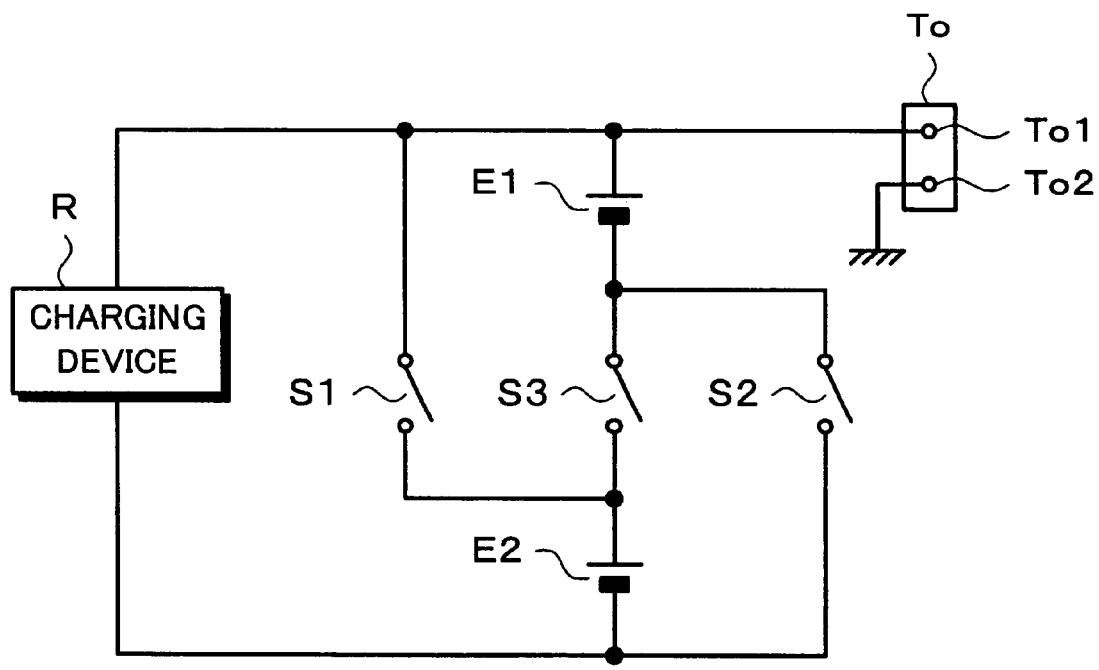
FIG. 4 is a block diagram of an embodiment of the invention.

Embodiments of the invention will now be described hereinbelow with reference to the drawings. FIG. 4 shows an embodiment of the invention. One output of a charging device R is connected to an output terminal To1 of the output terminal To and a + (plus) side of a secondary battery E1. A switching circuit S1 is provided between one output of the charging device R and a + side of a secondary battery E2 A switching circuit S3 is provided between a − (minus) side of the secondary battery E1 and the + side of the secondary battery E2 The other output of the charging device R is connected to a − side of the secondary battery E2 A switching circuit S2 is provided between the other output of the charging device R and the secondary battery E1. An output terminal To2 of the output terminal To is connected to the ground.

In case of charging the secondary batteries E1 and E2, the switching circuits S1 and S2 are turned on and the switching circuit S3 is turned off. In case of discharging the secondary batteries E1 and E2, the switching circuits S1 and S2 are turned off and the switching circuit S3 is turned on. With this construction, the secondary batteries in which characteristics such as capacities or the like are different can be fully charged.

Figure 5:
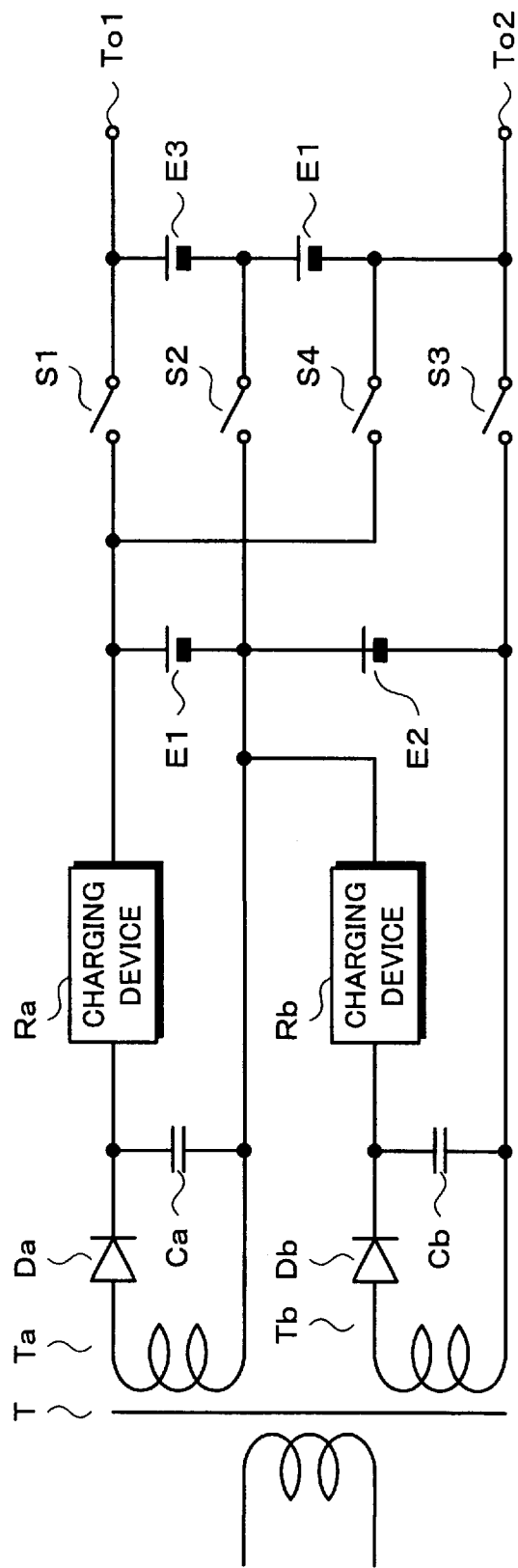
FIG. 5 is a block diagram of the first embodiment of the invention.

FIG. 5 shows the first embodiment to which the invention is applied. A rectifying circuit (a) comprising a diode Da and a capacitor Ca is provided for a winding Ta on the secondary side of a transformer T. Similarly, a rectifying circuit (b) comprising a diode Db and a capacitor Cb is provided for a winding Tb on the secondary side of the transformer T. A charging device Ra connected to one output of the rectifying circuit (a) is connected to the + side of the secondary battery E1. The + side of the secondary battery E1 is connected to the output terminal To1 and a + side of a secondary battery E3 through the switching circuit S1. The − side of the secondary battery E1 is connected to the other output of the rectifying circuit (a) and connected to a − side of the secondary battery E3 through the switching circuit S2.

A charging device Rb connected to one output of the rectifying circuit (b) is connected to the + side of the secondary battery E2 The + side of the secondary battery E2 is connected to a + side of a secondary battery E4 through the switching circuit S2. The − side of the secondary battery E2 is connected to the other output of the rectifying circuit (b) and connected to a − side of the secondary battery E4 through the switching circuit S3. The − side of the secondary battery E4 is connected to the output terminal To2. A switching circuit S4 is provided between the + side of the secondary battery E1 and the − side of the secondary battery E4.

Figure 6:
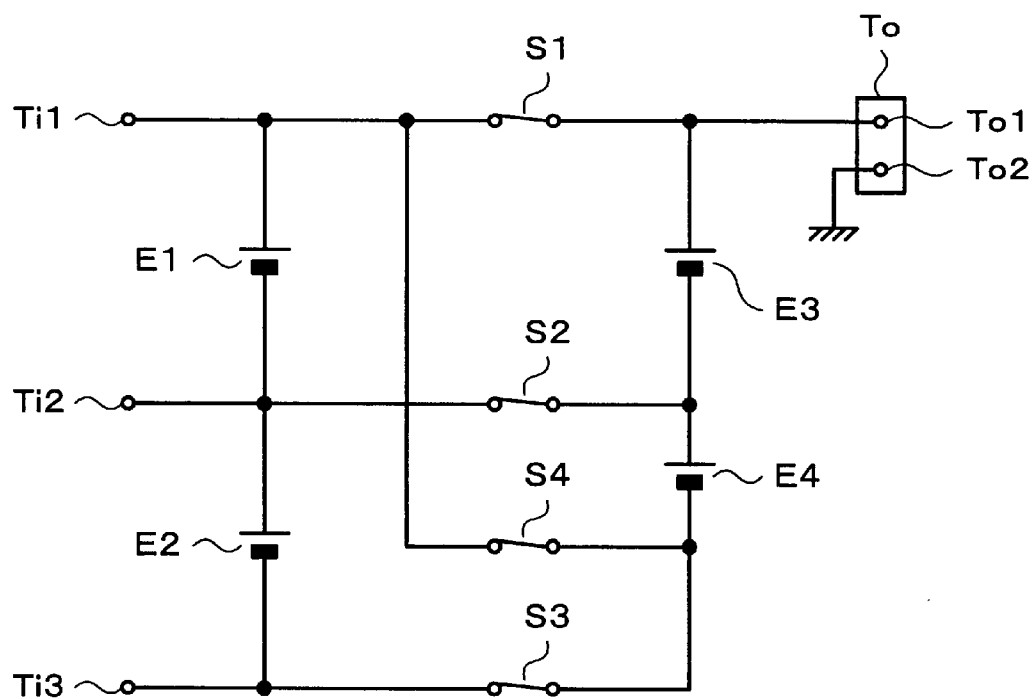
FIG. 6 is a schematic diagram for explaining a state at the time of charging in the first embodiment.

FIG. 6 shows a state of the switching circuits in case of charging the secondary batteries E1, E2, E3, and E4 in the first embodiment. The blocks having the same functions as those mentioned above are designated by the same reference numerals and their descriptions are omitted. As shown in FIG. 6, the switching circuits S1, S2, and S3 are turned on and the switching circuit S4 is turned off. In this instance, the secondary batteries E1 and E3 are charged by a voltage current from the rectifying circuit (a) and the secondary batteries E2 and E4 are charged by a voltage current from the rectifying circuit (b).

Figure 7:
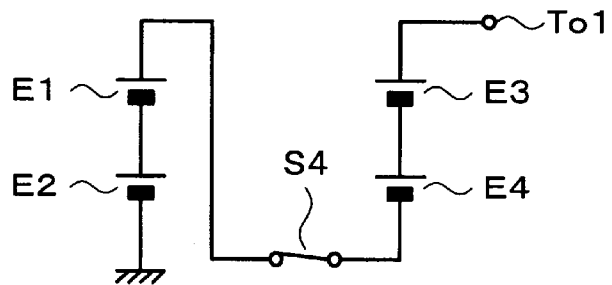
FIG. 7 is a schematic diagram for explaining a state at the time of discharging in the first embodiment.

FIG. 7 shows a state of the switching circuits in case of discharging the secondary batteries E1, E2, E3, and E4. As shown in FIG. 7, the switching circuit S4 is turned on. Although not shown, the switching circuits S1, S2, and S3 are turned off. In this instance, the secondary batteries E1, E2, E3, and E4 are serially connected and a synthesized voltage is outputted from the output terminal To1.

When the number of secondary batteries in the vertical direction is assumed to be M, the number of secondary batteries in the lateral direction is assumed to be N, and the number of secondary batteries in the vertical direction and the number of secondary batteries in the lateral direction are expressed by (M×N), in the first embodiment, (2×2) secondary batteries are provided for easy explanation. However, three or more secondary batteries can be also provided in each of the vertical and lateral directions. Specifically speaking, although the secondary batteries are arranged in a form of a matrix of (2×2) in the first embodiment shown in FIG. 5 mentioned above, the secondary batteries can be also arranged in a form of a matrix of (3×3), (3×4), or (4×2). That is, it is sufficient to set M and N to 2 or more integers.

Figure 8:
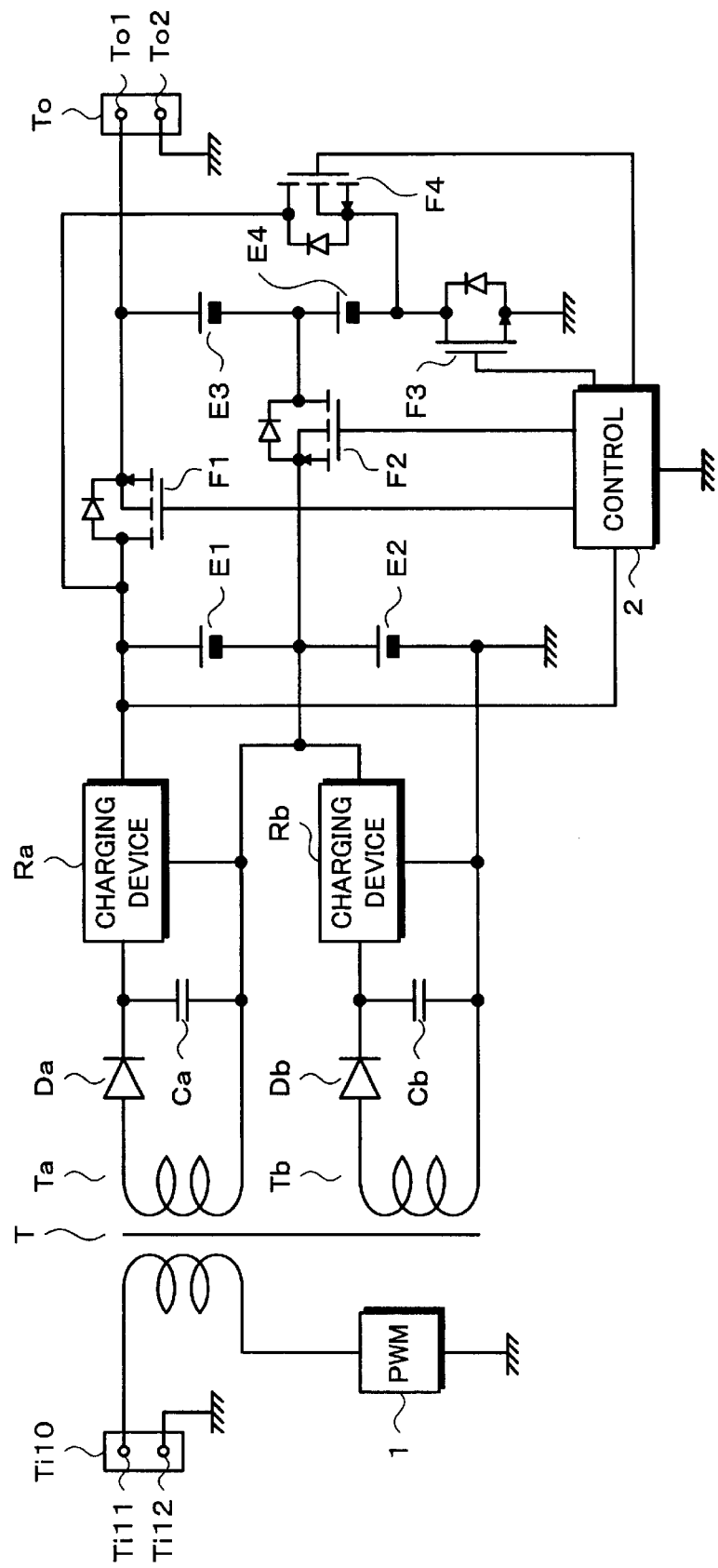
FIG. 8 is a detailed circuit diagram of the first embodiment.

FIG. 8 shows a detailed circuit diagram of the first embodiment. A commercially available power source is supplied through an input terminal Ti10. One end of the primary side of the transformer T is connected to an input terminal Ti11 and the other end is connected to the ground through a PWM (Pulse Width Modulation) circuit 1. The transformer T is controlled by the PWM circuit 1 and a voltage current corresponding to the on/off operations of the PWM circuit 1 is generated on the secondary side of the transformer T. The foregoing rectifying circuit (a) and charging device Ra are connected to the winding Ta on the secondary side of the transformer T. The foregoing rectifying circuit (b) and charging device Rb are connected to the winding Tb on the secondary side of the transformer T.

An output of the charging device Ra is supplied to a drain of a p-channel type FET F1 and to a control circuit 2. A gate of the FET F1 is connected to the control circuit 2 and its source is connected to the output terminal To1. A parasitic diode is provided for the FET F1.

An output of the charging device Rb is supplied to a source of a p-channel type FET F2. A gate of the FET F2 is connected to the control circuit 2 and its drain is connected to a node of the − side of the secondary battery E3 and the + side of the secondary battery E4. A parasitic diode is provided for the FET F2.

A drain of a p-channel type FET F3 is connected to the − side of the secondary battery E3, its gate is connected to the control circuit 2, and its source is connected to the ground. A parasitic diode is provided for the FET F3.

The output of the charging device Ra is supplied to a drain of a p-channel type FET F4. A source of the FET F4 is connected to the − side of the secondary battery E4 and its gate is connected to the control circuit 2. A parasitic diode is provided for the FET F4.

The FET F1 used in FIG. 8 is the foregoing switching circuit S1 and its on/off operations are controlled by the control circuit 2. Similarly, the FETs F2, F3, and F4 are the switching circuits S2, S3, and S4 and their on/off operations are controlled by the control circuit 2.

Figure 9:
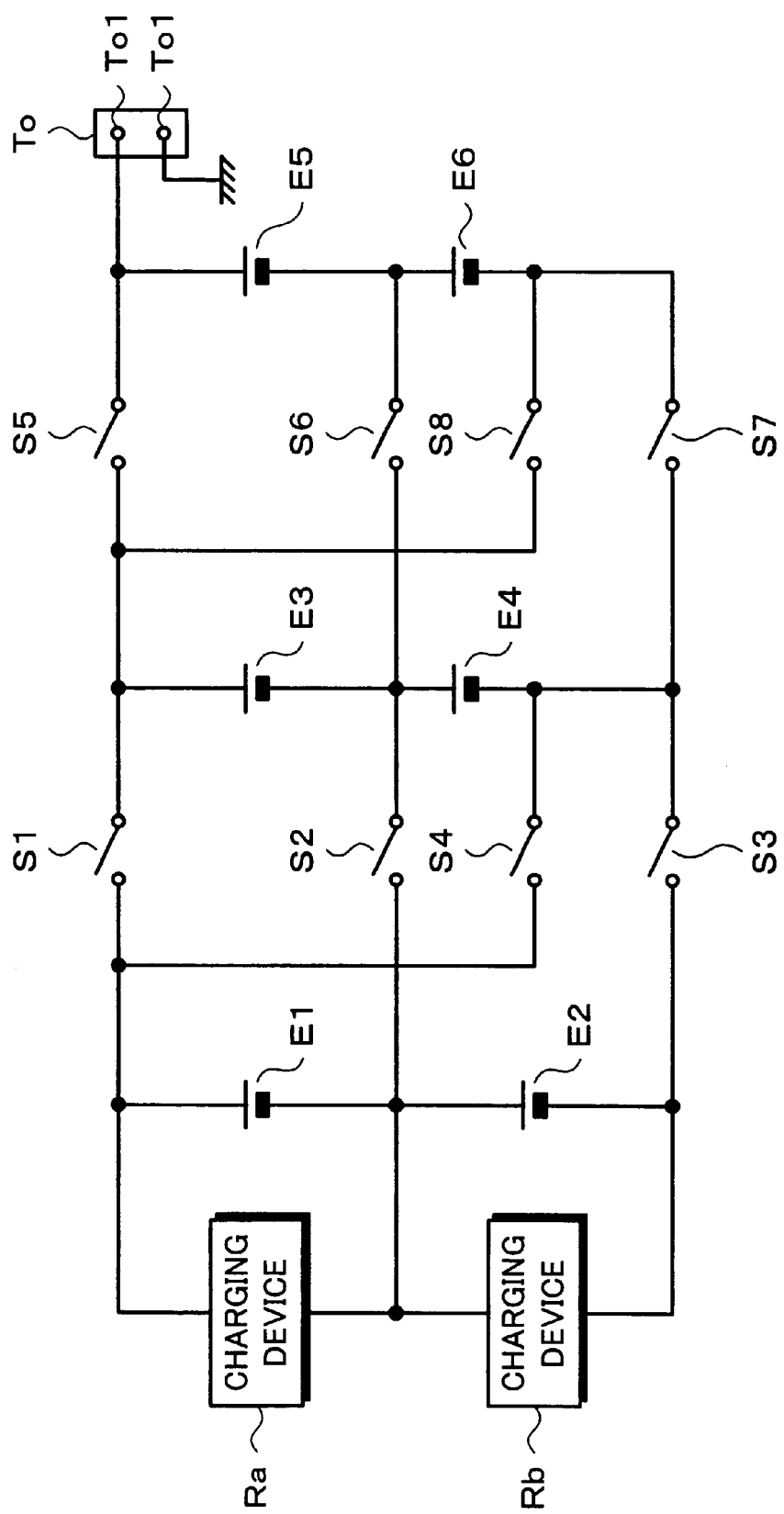
FIG. 9 is a block diagram of the second embodiment of the invention.

FIG. 9 shows the second embodiment in which charging devices are serially arranged, secondary batteries are connected in parallel at the time of charging, and the secondary batteries are serially connected at the time of discharging. One output terminal of the charging device Ra is connected to the + side of the secondary battery E1. The switching circuit S1 is provided between the + side of the secondary battery E1 and the + side of the secondary battery E3. A switching circuit S5 is provided between the + side of the secondary battery E3 and a + side of a secondary battery E5. The + side of the secondary battery E5 is connected to the output terminal To1. The other output terminal of the charging device Ra is connected to the − side of the secondary battery E1. The switching circuit S2 is provided between the − side of the secondary battery E1 and the − side of the secondary battery E3. A switching circuit S6 is provided between the − side of the secondary battery E3 and the − side of the secondary battery E5.

The other output terminal of the charging device Ra is connected to one output terminal of the charging device Rb. One output terminal of the charging device Rb is connected to the + side of the secondary battery E2 The switching circuit S2 is provided between the + side of the secondary battery E2 and the + side of the secondary battery E4. The switching circuit S6 is provided between the + side of the secondary battery E4 and a + side of a secondary battery E6. The other output terminal of the charging device Rb is connected to the − side of the secondary battery E2 The switching circuit S3 is provided between the − side of the secondary battery E2 and the side of the secondary battery E4. A switching circuit S7 is provided between the − side of the secondary battery E4 and a − side of the secondary battery E6.

The switching circuit S4 is provided between the + side of the secondary battery E1 and the − side of the secondary battery E4. A switching circuit S8 is provided between the + side of the secondary battery E3 and the − side of the secondary battery E6.

As mentioned above, the secondary batteries E1, E3, and E5 are arranged in parallel with the charging device Ra and the secondary batteries E2, E4, and E6 are arranged in parallel with the charging device Rb. The charging devices Ra and Rb, secondary batteries E1 and E2, secondary batteries E3 and E4, and secondary batteries E5 and E6 are serially arranged.

Figure 10:
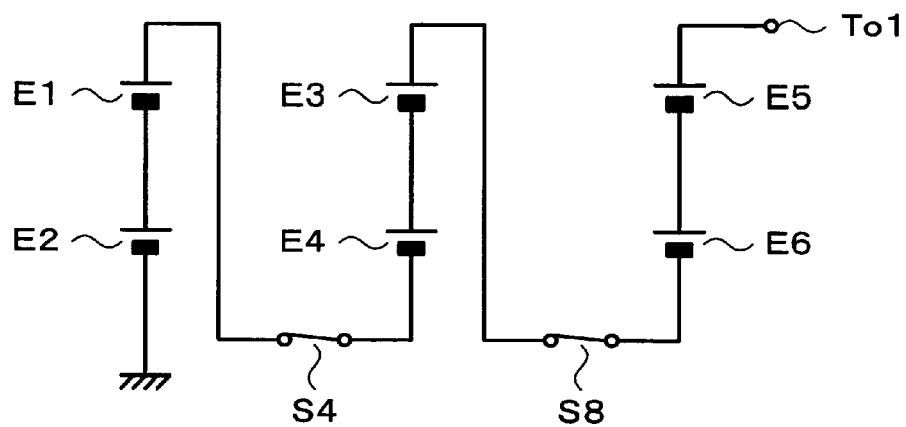
FIG. 10 is a schematic diagram for explaining a state at the time of discharging in the second embodiment.

FIG. 10 shows a state of the switching circuits in case of discharging the secondary batteries E1 to E6. As shown in FIG. 10, the switching circuits S4 and S8 are turned on. Although not shown, the switching circuits S1, S2, S3, S5, S6, and S7 are turned off. In this instance, the secondary batteries E1 to E6 are serially connected and a synthesized voltage is outputted from the output terminal To1.

When the secondary batteries E1 to E6 are charged, the switching circuits S1, S2, S3, S5, S6, and S7 are turned on and the switching circuits S4 and S8 are turned off. By this method, the secondary batteries can be charged while keeping a good balance at the time of charging.

Figure 11:
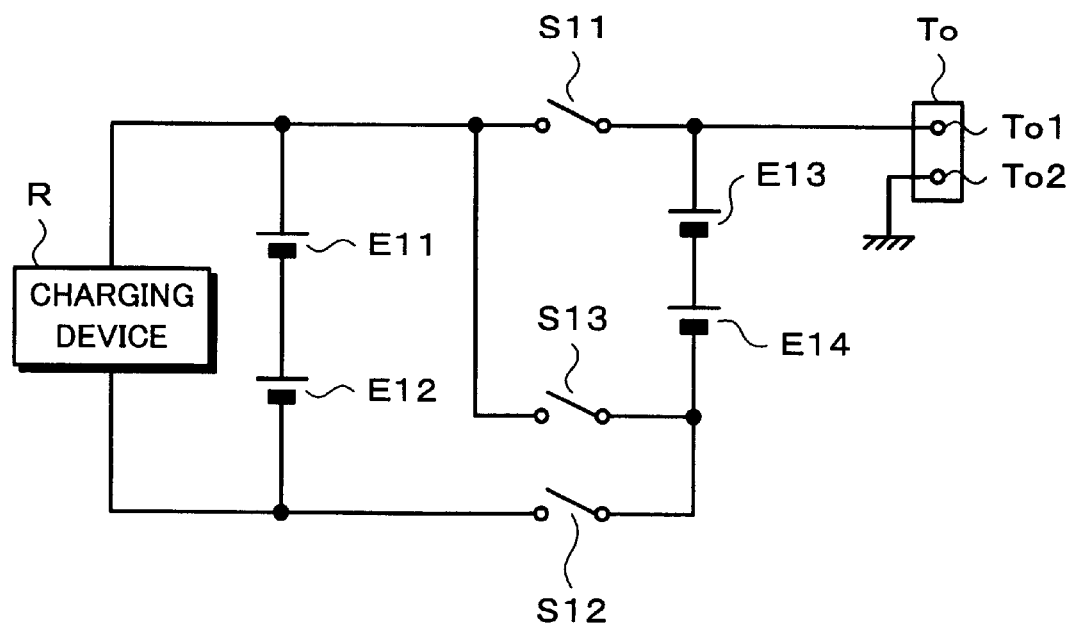
FIG. 11 is a block diagram of the third embodiment of the invention.

FIG. 11 shows the third embodiment of the invention. In the third embodiment, two secondary batteries whose characteristics almost coincide are serially connected. One output terminal of the charging device R is connected to a + side of a secondary battery E11. A switching circuit S11 is provided between the + side of the secondary battery E11 and a + side of a secondary battery E13. The + side of the secondary battery E13 is connected to the output terminal To1. A − side of the secondary battery E11 is connected to a + side of a secondary battery E12. A − side of the secondary battery E13 is connected to a + side of a secondary battery E14. The other output terminal of the charging device R is connected to a − side of the secondary battery E12. A switching circuit S12 is provided between the − side of the secondary battery E12 and a − side of the secondary battery E14. A switching circuit S13 is provided between the + side of the secondary battery E11 and the − side of the secondary battery E14.

Figure 12:
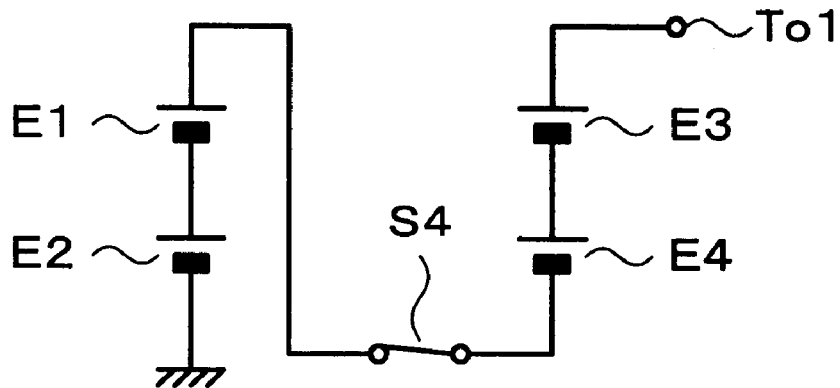
FIG. 12 is a schematic diagram for explaining a state at the time of discharging in the third embodiment.

FIG. 12 shows a state of the switching circuits in case of discharging the secondary batteries E11, E12, E13, and E14. As shown in FIG. 12, the switching circuit S13 is turned on. Although not shown, the switching circuits S11 and S12 are turned off. In this instance, the secondary batteries E11 to E14 are serially connected and a synthesized voltage is outputted from the output terminal To1.

Figure 13:
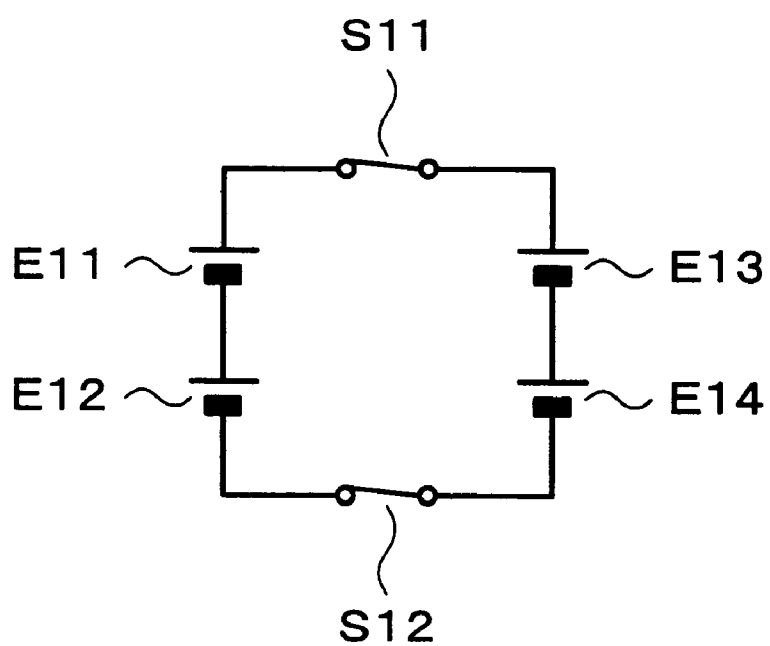
FIG. 13 is a schematic diagram for explaining a state at the time of discharging in the third embodiment.

Further, as another example at the time of discharging, as shown in FIG. 13, the switching circuits S11 and S12 are turned on and the switching circuit S13 is turned off. In this instance, the secondary batteries E11 and E12 and the secondary batteries E13 and E14 are connected in parallel. Specifically speaking, a synthesized voltage obtained from (E11+E12)//(E13+E14) is outputted from the output terminal To1. As mentioned above, the voltage to be outputted can be switched by the on/off operations of the switching circuits.

Figure 14:
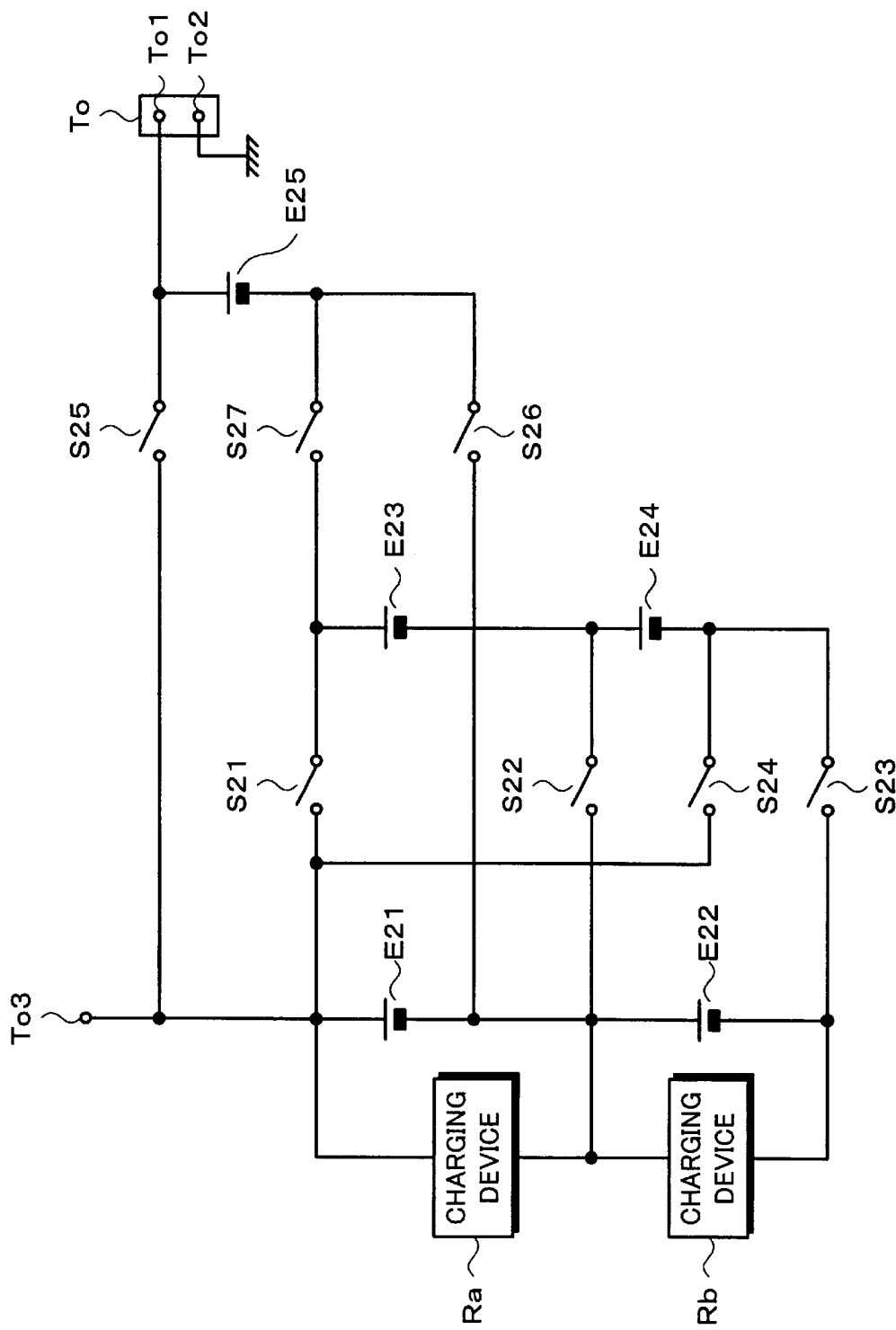
FIG. 14 is a block diagram of the fourth embodiment of the invention.

FIG. 14 shows the fourth embodiment of the invention. One output terminal of the charging device Ra is connected to an output terminal To3 and a + side of a secondary battery E21. A switching circuit S21 is provided between the + side of the secondary battery E21 and a + side of a secondary battery E23. A switching circuit S25 is provided between the + side of the secondary battery E21 and a + side of a secondary battery E25. The + side of the secondary battery E25 is connected to the output terminal To1. A switching circuit S27 is provided between the + side of the secondary battery E23 and a − side of the secondary battery E25.

The other output terminal of the charging device Ra is connected to a − side of the secondary battery E21. A switching circuit S22 is provided between the − side of the secondary battery E21 and a side of the secondary battery E23. A switching circuit S26 is provided between the − side of the secondary battery E21 and the − side of the secondary battery E25.

One output of the charging device Rb is connected to a + side of a secondary battery E22. A switching circuit S22 is provided between the + side of the secondary battery E22 and a + side of the secondary battery E24. The other output of the charging device Rb is connected to the − side of the secondary battery E22. A switching circuit S23 is provided between the side of the secondary battery E22 and a − side of the secondary battery E24. A switching circuit S24 is provided between the + side of the secondary battery E21 and the − side of the secondary battery E24.

Figure 15:
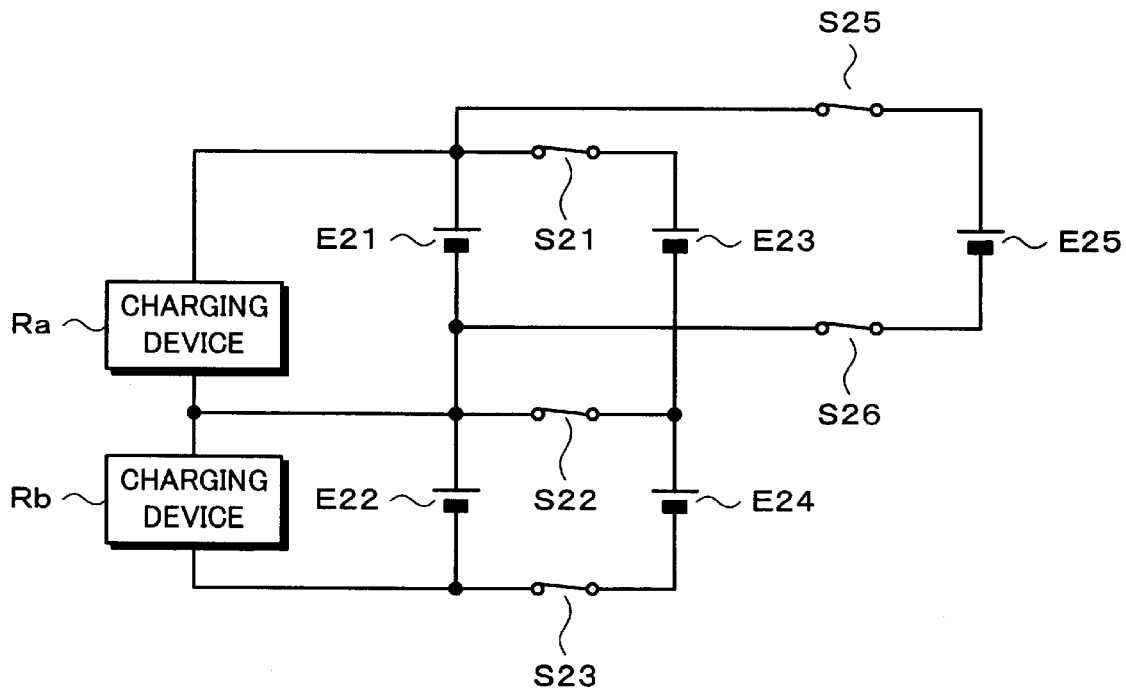
FIG. 15 is a schematic diagram for explaining a state at the time of charging in the fourth embodiment.

FIG. 15 shows an example in case of charging the secondary batteries E21 to E25 used in the fourth embodiment. As shown in the diagram, the switching circuits S21, S22, S23, S25, and S26 are turned on. Although not shown, the switching circuits S24 and S27 are turned off.

Figure 16:
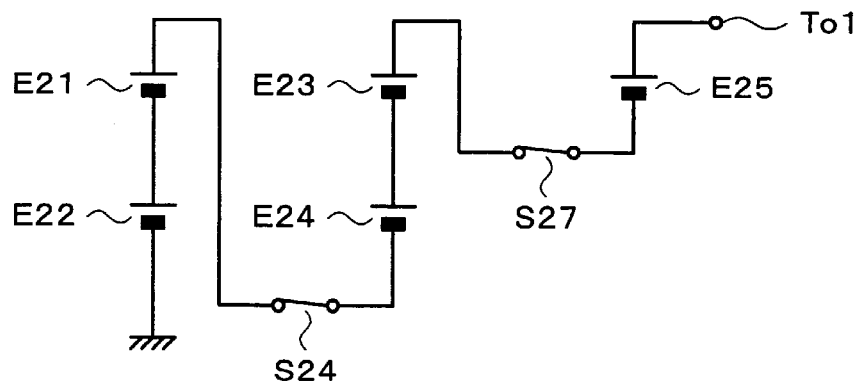
FIG. 16 is a schematic diagram for explaining a state at the time of discharging in the fourth embodiment.

FIG. 16 shows the first example in case of discharging the secondary batteries E21 to E25 used in the fourth embodiment. As shown in the diagram, the switching circuits S24 and S27 are turned on. Although not shown, the switching circuits S21, S22, S23, S25, and S26 are turned off. Thus, the secondary batteries E21 to E25 are serially connected and a synthesized voltage is outputted from the output terminal To1.

Figure 17:
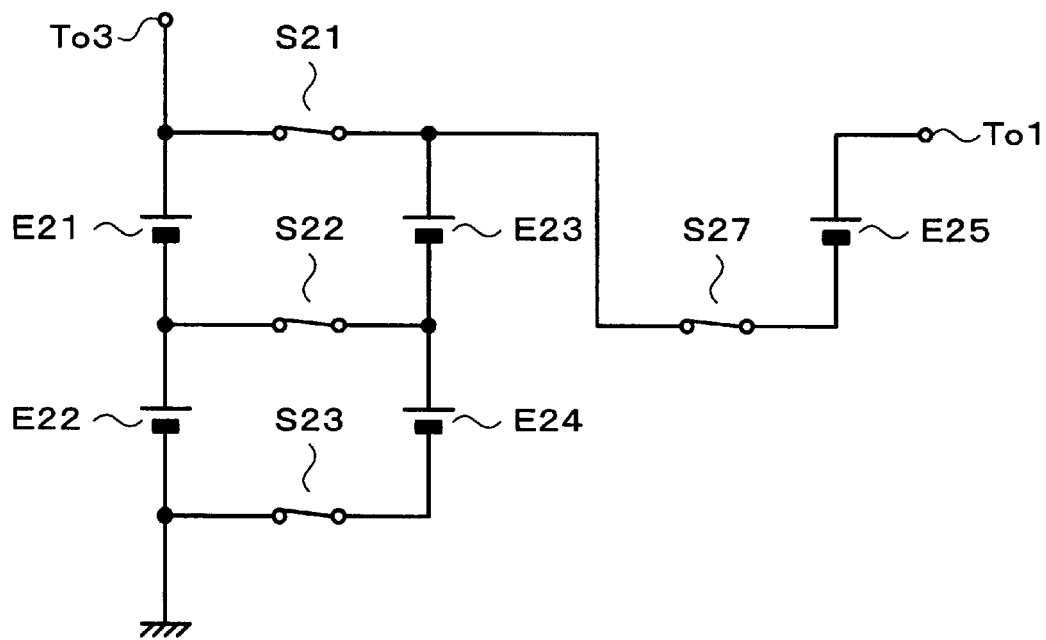
FIG. 17 is a schematic diagram for explaining a state at the time of discharging in the fourth embodiment.

FIG. 17 shows the second example in case of discharging the secondary batteries E21 to E25 used in the fourth embodiment. As shown in the diagram, the switching circuits S21, S22, S23, and S27 are turned on. Although not shown, the switching circuits S24, S25, and S26 are turned off. In this instance, a synthesized voltage of the secondary batteries E21, E22, E23, and E24 is outputted from the output terminal To3. Specifically speaking, a synthesized voltage obtained from $(E21+E22)//(E23+E24)$ is outputted from the output terminal To3. A synthesized voltage of the secondary batteries E21, E22, E23, E24, and E25 is outputted from the output terminal To1. Specifically speaking, a synthesized voltage obtained from $(E21+E22+E25)//(E23+E24)$ is outputted from the output terminal To1.

Figure 18:
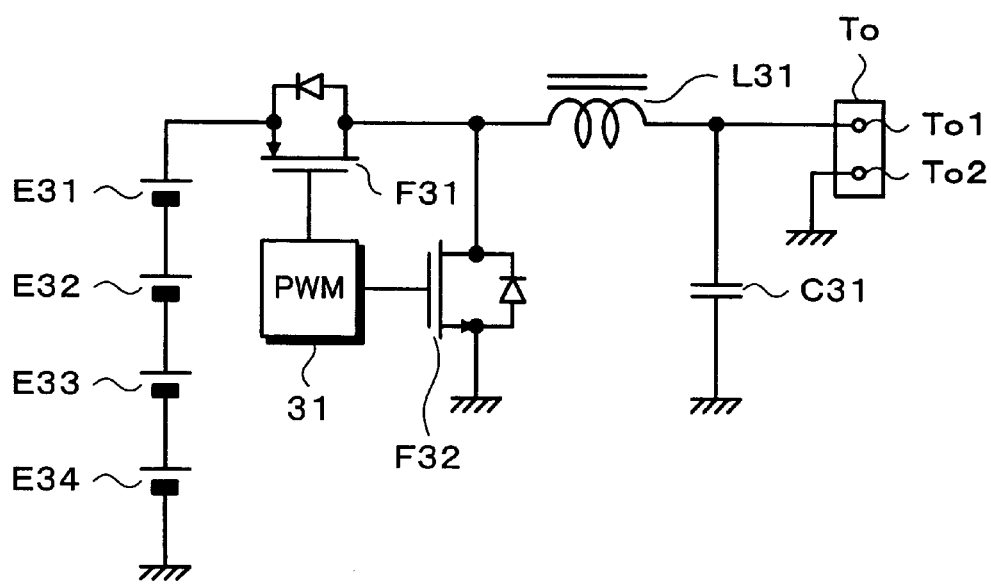
FIG. 18 is an example of a DC/DC switching power source to which the invention can be applied.

FIG. 18 shows an example in which a plurality of secondary batteries are combined and used as a power source of a DC/DC switching power source. Secondary batteries E31, E32, E33, and E34 are serially connected. A + side of the secondary battery E31 is connected to a source of an n-channel type FET F31. A gate of the FET F31 is connected to a PWM circuit 31 and its drain is connected to a drain of a p-channel type FET F32. A parasitic diode is provided for the FET F31. A gate of the FET F32 is connected to the PWM circuit 31. A source of the FET F32 is connected to the ground. A parasitic diode is provided for the FET F32. An inductor L31 is provided between the drain of the FET F31 and the output terminal To1. A capacitor C31 is provided between the output terminal To1 and the ground. A conversion efficiency η of the DC/DC switching power source is set to a value within a range from 95% to 98%.

Figure 19:
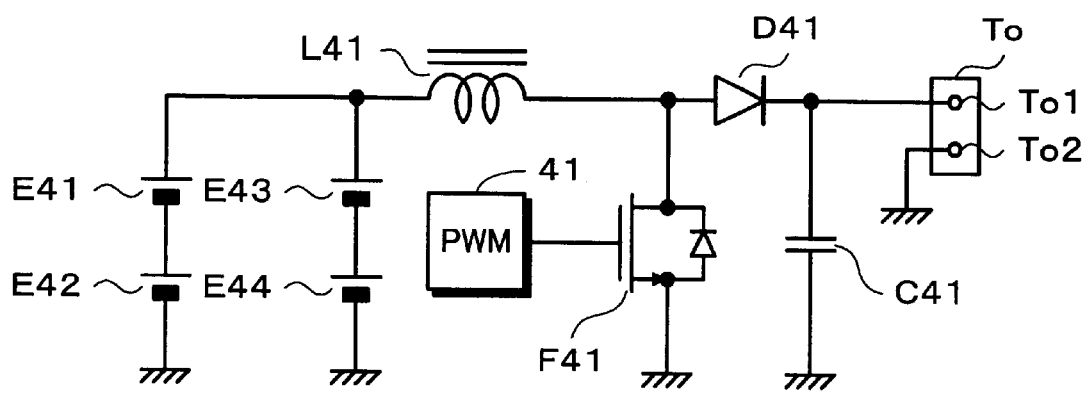
FIG. 19 is another example of a DC/DC switching power source to which the invention can be applied.

FIG. 19 similarly shows another example in which a plurality of secondary batteries are combined and used as a power source of a DC/DC switching power source. Secondary batteries E41 and E42 which are serially connected and secondary batteries E43 and E44 which are serially connected are connected in parallel. An inductor L41 is provided between a + side of the secondary battery E41 and a drain of a p-channel type FET F41. A gate of the FET F41 is connected to a PWM circuit 41 and its source is connected to the ground. A parasitic diode is provided for the FET F41. An anode of a diode D41 is connected to the drain of the FET F41 and its cathode is connected to the output terminal To1. A capacitor C41 is inserted between the cathode of the diode D41 and the ground. The conversion efficiency η of the DC/DC switching power source shown in FIG. 19 is set to a value within a range from 85% to 90%.

As mentioned above, when the secondary batteries are charged, they can be stably charged, and a high voltage can be obtained by serially connecting the secondary batteries and using them. At the time of discharging, since the serial construction and the parallel construction of the secondary batteries can be switched, by obtaining the high voltage, an efficient system can be used in case of using the DC/DC switching power source.

Although the parallel construction and the serial construction of a plurality of secondary batteries are switched by using the switching circuits in the embodiments, as disclosed in the Official Gazette of Japanese Utility Model Registration Application Laid-open No. 4-99671, the parallel construction and the serial construction can be also switched in order to supply a voltage current adapted to electronic equipment by using a top cover of a power source casing in which batteries of the UM-3 type are arranged.

Although the parallel construction and the serial construction of a plurality of secondary batteries are switched by using the switching circuits in the embodiments, the batteries can be also discharged in accordance with a voltage current using a plurality of secondary batteries.

In the embodiments, one of a lithium ion secondary battery, a nickel cadmium secondary battery, and a nickel hydrogen secondary battery is properly used as a secondary battery. A voltage within a range from 2.5V to 4.2V can be outputted per cell, respectively.

In the embodiments, as a protecting circuit for the secondary battery, a PTC (Positive Temperature Coefficient) is provided for each secondary battery, thereby detecting a temperature.

According to the invention, even in case of the secondary batteries having different characteristics, it is possible to charge while keeping a good balance. The number of switching circuits which are used when the secondary batteries connected in parallel are serially connected and discharged can be reduced. Since the parallel construction and the serial construction of secondary batteries can be switched, the efficiency of the DC/DC switching power source can be improved.

The present invention is not limited to the foregoing embodiments but many modifications and variations are possible within the spirit and scope of the appended claims of the invention.

What is claimed is:

1. A battery pack having a plurality of secondary batteries comprising:

a secondary battery matrix including at least two of said secondary batteries arranged in a vertical direction and at least one of said secondary batteries arranged in a lateral direction;

a charging path for charging said secondary battery matrix in parallel, wherein said charging path is formed by a plurality of switching elements; and a discharging path for discharging said secondary battery matrix in series, wherein said discharging path is formed by said plurality of switching elements.

2. A battery pack according to claim 1, wherein at least two of said secondary batteries having almost coincident characteristics are serially connected to said charging path.

3. A power source apparatus having a plurality of secondary source batteries comprising:

an input terminal for inputting an AC power source;

a battery pack in which at least two of said secondary batteries are arranged in a vertical direction and at least one of said secondary batteries is arranged in a lateral direction;

a charging path for charging said battery pack in parallel, wherein said charging path is formed by a plurality of switching elements;

a discharging path for discharging said battery pack in series, wherein said discharging path is formed by said plurality of switching elements;

a charging power generating means for charging said battery pack; and a connecting terminal for connecting a load.

4. A charging and discharging method of charging and discharging a plurality of secondary batteries, comprising the steps of:

arranging at least two of said secondary batteries in a vertical direction and at least one of said secondary batteries in a lateral direction;

charging said secondary batteries in parallel; and discharging said secondary batteries serially.

* * * * *